United States Patent [19]

Miyake et al.

[11] Patent Number: 4,814,418

[45] Date of Patent: Mar. 21, 1989

[54] FLUOROSILICONE POLYMER, PROCESSES FOR THE PRODUCTION THEREOF AND COMPOSITION CONTAINING IT

[75] Inventors: Haruhisa Miyake; Seiji Shin-ya; Yutaka Furukawa, all of Yokohama, Japan

[73] Assignee: Asahi Glass Company, Ltd., Tokyo, Japan

[21] Appl. No.: 82,550

[22] Filed: Aug. 7, 1987

[30] Foreign Application Priority Data

| Aug. 8, 1986 | [JP] | Japan | 61-185268 |
| Aug. 8, 1986 | [JP] | Japan | 61-185269 |
| Aug. 22, 1986 | [JP] | Japan | 61-197980 |
| Nov. 28, 1986 | [JP] | Japan | 61-282097 |

[51] Int. Cl.$^4$ ............................................. C08G 77/04
[52] U.S. Cl. .................................... 528/37; 528/14; 528/21; 528/23; 528/42; 556/462
[58] Field of Search ............... 528/37, 42, 14, 23, 528/21; 556/462

[56] References Cited

U.S. PATENT DOCUMENTS

| 3,002,951 | 10/1961 | Johannson | 528/37 |
| 3,122,521 | 2/1964 | Pierce | 528/37 |
| 3,481,898 | 12/1969 | Davies et al. | 528/37 |
| 3,560,437 | 2/1971 | Szendrey | 528/37 |
| 3,978,104 | 8/1976 | Razzano | 528/37 |
| 4,008,261 | 2/1977 | Brown et al. | 556/462 |
| 4,028,338 | 6/1977 | Razzano | 528/37 |
| 4,122,247 | 10/1978 | Evans | 528/14 |
| 4,157,337 | 6/1979 | Evans | 528/42 |
| 4,317,899 | 3/1982 | Bluestein et al. | 528/42 |
| 4,341,888 | 7/1982 | Razzano | 528/37 |
| 4,525,528 | 6/1985 | Bush et al. | 528/37 |

*Primary Examiner*—Melvyn I. Marquis
*Attorney, Agent, or Firm*—Oblon, Fisher, Spivak, McClelland & Maier

[57] ABSTRACT

A fluorosilicone polymer comprising from 30 to 99.95 mol % of units of a cyclic trisiloxane of the formula (a) $+R_fCH_2CH_2(R^1)SiO+_3$, from 0.05 to 10 mol % of units of a cyclic siloxane of the formula (b) $+R^2R^3SiO+_m$, and from 0 to 69.95 mol % of units of a cyclic siloxane of the formula (c) $+R^4R^5SiO+_n$, wherein each of $R^1$, $R^3$, $R^4$, and $R^5$ is a monovalent organic group, $R_f$ is a perfluoroalkyl group having from 4 to 6 carbon atoms, $R^2$ is an alkenyl group, and each of m and n is an integer of from 3 to 6.

6 Claims, No Drawings

FLUOROSILICONE POLYMER, PROCESSES FOR THE PRODUCTION THEREOF AND COMPOSITION CONTAINING IT

The present invention relates to a fluorosilicone polymer, processes for the production thereof and a composition containing it.

Heretofore, silicone polymers composed of organopolysiloxanes have been known. Silicone polymers are used for silicone oils, silicone elastomers or silicone rubbers, or for other applications. Elastomers or rubbers may also be obtained by cross-linking silicone polymers having an unsaturated group such as a vinyl group. A fluoroalkyl group-containing diorganopolysiloxane so-called a fluorosilicone polymer is obtainable from a cyclic polysiloxane having a fluoroalkyl group. As a typical fluorosilicone polymer, a polymer having methyltrifluoropropylsiloxane units (see Japanese examined patent publication No. 10940/1959) or a fluorosilicone copolymer having such units (see Japanese examined patent publication No. 10045/1985 or Japanese unexamined patent publication No. 92921/1981) is known. Such a fluorosilicone (co)-polymer is produced by ring-opening polymerization of a fluoroalkyl group-containing cyclic polysiloxane (or a mixture of such a polysiloxane with other cyclic polysiloxane) in the presence of an alkaline catalyst. Various alkaline catalysts may be employed as such an alkaline catalyst. For example, it includes an alkali metal hydroxide, a quaternary ammonium hydroxide, a silanolate of such a hydroxide, a complex of such a hydroxide or silanolate with a cyclic ether or a non-cyclic ether, and an alkyl lithium. These alkaline catalysts are disclosed in the above-mentioned applications or in Japanese examined patent publications Nos. 50056/1980, 10739/1984, 8095/1986 and 10487/1986.

A fluorosilicone polymer of methyltrifluoropropylpolysiloxane type or its cross-linked product possesses inadequate solvent resistance. Namely, it has excellent solvent resistance against a nonpolar solvent such as a fuel oil, but it swells substantially in a polar solvent such as acetone and has no resistance thereto. Whereas, according to the study by the present inventors, a fluorosilicone polymer having a long chain polyfluoroalkyl group such as $-C_4F_9CH_2CH_2-$ has excellent solvent resistance against each of a polar solvent or non-polar solvent. However, such a fluorosilicone polymer having a long chain polyfluoroalkyl group usually has poor mechanical properties unless it is cross-linked. Yet, such a fluorosilicone polymer can hardly be cross-linked, and it has been found that a substantial amount of cross linking groups must be introduced in order to improve the cross-linking properties. Thus, for the fluorosilicone polymer having a long chain fluoroalkyl group, it is believed necessary to introduce at least about 2 to 4 mol % of diorganosiloxane units having a vinyl group as a cross linking group, relative to the total diorganosiloxane units. However, if a substantial amount of cross-linking groups is introduced to improve the cross-linking properties, the cross-linked product is likely to contain a substantial amount of unreacted cross-linking groups, whereby the stability of the cross linked product tends to deteriorate. Accordingly, it is desired to improve the cross-linking properties of a fluorosilicone polymer having a long chain polyfluoroalkyl group and to provide a fluorosilicone polymer whereby adequate cross-linking can be conducted with a small amount of cross-linking groups.

Under the circumstances, it is an object of the present invention to provide a fluorosilicone polymer having excellent solvent resistance against both polar and non-polar solvents and having excellent cross-linking properties.

A further object of the present invention is to provide processes for the production of the fluorosilicone polymer, and a composition containing it.

The present invention provides a fluorosilicone polymer comprising from 30 to 99.95 mol % of units of a cyclic trisiloxane of the formula (a) $\{R_fCH_2CH_2(R^1)SiO\}_{\overline{3}}$, from 0.05 to 10 mol % of units of a cyclic siloxane of the formula (b) $\{R^2R^3SiO\}_{\overline{m}}$, and from 0 to 69.95 mol % of units of a cyclic siloxane of the formula (c) $\{R^4R^5SiO\}_{\overline{n}}$, wherein each of $R^1$, $R^3$, $R^4$ and $R^5$ is a monovalent organic group, $R_f$ is a perfluoroalkyl group having from 4 to 6 carbon atoms, $R^2$ is an alkenyl group, and each of m and n is an integer of from 3 to 6.

Such a fluorosilicone polymer can be prepared by a process which comprises polymerizing in the presence of a catalyst from 30 to 99.95 mol % of a cyclic trisiloxane of the formula (a) $\{R_fCH_2CH_2(R^1)SiO\}_{\overline{3}}$, from 0.05 to 10 mol % 5 of a cyclic siloxane of the formula (b) $\{R^2R^3SiO\}_{\overline{m}}$, and from 0 to 69.95 mol % of a cyclic siloxane of the formula (c) $\{R^4R^5SiO\}_{\overline{n}}$, wherein each of $R^1$, $R^3$, $R^4$ and $R^5$ is a monovalent organic group, $R_f$ is a perfluoroalkyl group having from 4 to 6 carbon atoms, $R^2$ is an alkenyl group, and each of m and n is an integer of from 3 to 6.

The present invention also provides a process for producing a fluorosilicone polymer, which comprises polymerizing a cyclic trisiloxane of the formula $\{R^6R^7SiO\}_{\overline{3}}$ wherein $R^6$ is a monovalent organic group and $R^7$ is a polyfluoroalkyl group, and, if necessary, other copolymerizable cyclic siloxane, in the presence of a polymerization catalyst containing a phase transfer catalyst.

Further, the present invention provides a process for producing a fluorosilicone polymer, which comprises polymerizing a cyclic trisiloxane of the formula $\{R^6R^7SiO\}_{\overline{3}}$ wherein $R^6$ is a monovalent organic group and $R^7$ is a polyfluoroalkyl group, and, if necessary, other copolymerizable cyclic siloxane, in the presence of a polymerization catalyst containing an alkali metal silanolate having a fluoroalkyl group.

The present invention also provides a curable fluorosilicone composition comprising (i) a fluorosilicone polymer comprising from 30 to 99.95 mol % of units of a cyclic trisiloxane of the formula (a) $\{R_fCH_2CH_2(R^1)SiO\}_{\overline{3}}$, from 0.05 to 10 mol % of units of a cyclic siloxane of the formula (b) $\{R^2R^3SiO\}_{\overline{m}}$, and from 0 to 69.95 mol % of units of a cyclic siloxane of the formula (c) $\{R^4R^5SiO\}_{\overline{n}}$, wherein each of $R^1$, $R^3$, $R^4$ and $R^5$ is a monovalent organic group, $R_f$ is a perfluoroalkyl group having from 4 to 6 carbon atoms, $R^2$ is an alkenyl group, and each of m and n is an integer of from 3 to 6, (ii) a cross linking agent, and (iii) a filler.

Now, the present invention will be described in detail with reference to the preferred embodiments.

In the present invention, the cyclic trisiloxane of the formula (a) (hereinafter referred to as the cyclic trisiloxane (a)) is preferably the one wherein $R_f$ has 4 carbon atoms. $R_f$ may be a branched perfluoroalkyl group, but it is preferably a straight chain perfluoroalkyl group. $R^1$ is preferably a lower alkyl group (i.e. an alkyl group having at most 4 carbon atoms; the same applies hereinafter). Among the lower alkyl groups, a methyl group and an ethyl group are preferred. Particularly preferred is a methyl group. As the cyclic trisiloxane (a), it is possible to employ those having different $R_f$ or $R^1$ in combination.

The cyclic siloxane of the formula (b) (hereinafter referred to as the cyclic siloxane (b)) is preferably the one wherein $R^2$ is a vinyl group. $R^3$ is preferably a methyl group, an ethyl group or a phenyl group. Particularly preferred is a methyl group. Further, m is preferably an integer of 3 or 4. Particularly preferred is a cyclic trisiloxane wherein m is 3, which is highly copolymerizable with the cyclic trisiloxane (a). As the cyclic siloxane (b), it is possible to employ those having different $R^2$, $R^3$ or m in combination.

The cyclic siloxane of the formula (c) (hereinafter referred to as the cyclic siloxane (c)) is preferably the one wherein $R^4$ is a lower alkyl group. Among the lower alkyl groups, a methyl group and an ethyl group are preferred. Particularly preferred is a methyl group. $R^5$ is preferably a fluorine-substituted or un-substitud lower alkyl group. Particularly preferred is a methyl group or a trifluoropropyl group. Further, n is preferably 3 or 4. The most preferred is a cyclic trisiloxane wherein n is 3, which is highly copolymerizable with the cyclic trisiloxane (a). As the cyclic siloxane (c), it is possible to employ those having different $R^4$, $R^5$ or n in combination.

The fluorosilicone polymer of the present invention comprises from 30 to 99.95 mol % of units of the cyclic trisiloxane (a), from 0.05 to 10 mol % of units of the cyclic siloxane (b) and from 0 to 69.95 mol % of units of the cyclic siloxane (c). The proportion of the cyclic siloxane (c) is preferably from 5 to 69.95 mol %, whereby the fluorosilicone polymer will have excellent crosslinking properties. If the units of the cyclic trisiloxane (a) are less than the above range, the solvent resistance against e.g. a polar solvent tends to be poor, such being undesirable. If the units of the cyclic siloxane (b) are less than the above range, the crosslinking properties tend to be inferior, and if they are excessive, unreacted cross-linking groups tend to remain after the cross-linking operation, such being undesirable. The proportion of the units of the cyclic siloxane (b) is preferably from 0.1 to 5 mol %. The contents of the respective units in the fluorosilicone polymer correspond substantially to the molar ratios of the respective monomers charged for the polymerization. Accordingly, the fluorosilicone polymer can be prepared by the ring-opening polymerization of the cyclic trisiloxane (a), the cyclic trisiloxane (b) and the cyclic siloxane (c) by adjusting the molar ratios of the respective charges to be within the above-mentioned ranges.

In the present invention, the fluorosilicone polymer can be prepared by polymerizing the prescribed amounts of the respective monomers in the presence of a polymerization catalyst.

As the polymerization catalyst, a conventional alkaline catalyst may be employed. However, when a conventional alkaline catalyst such as an alkali metal hydroxide, a quaternary ammonium hydroxide, a silanolate of such hydroxides, a complex of the silanolate wih a cyclic ether or a non-cyclic ether, or an alkyl lithium, is used, it is hardly possible to obtain a fluorosilicone polymer having a high degree of polymerization. A fluorosilicone polymer having a low degree of polymerization has a difficulty that the mechanical properties of the cross-linked product tend to be poor. The difficulty in obtaining a polymer having a high degree of polymerization is remarkable especially when it is intended to obtain a fluorosilicone polymer having a long chain fluoroalkyl group.

The present inventors have found a process for producing a fluorosilicone polymer having a long chain fluoroalkyl group and yet having a high degree of polymerization. Namely, such a fluorosilicone polymer can be prepared by polymerizing a cyclic trisiloxane of the formula $\{R^6R^7SiO\}_3$ wherein $R^6$ is a monovalent organic group and $R^7$ is a polyfluoroalkyl group, and a copolymerizable cyclic siloxane in the presence of a polymerization catalyst containing a phase transfer catalyst or in the presence of a polymerization catalyst containing an alkali metal silanolate having a fluoroalkyl group. Here, $R^6$ is preferably a lower alkyl group, particularly a methyl group or an ethyl group. $R^7$ is preferably $R'_fCH_2CH_2$ wherein $R'_f$ is $C_xF_{2x+1}-$ or $HC_xF_{2x}-$ wherein $X$ is an integer of from 1 to 16. According to the process wherein the polymerization catalyst containing a phase transfer catalyst is employed, the fluorosilicone polymer is produced by subjecting the monomers to ring-opening polymerization in the presence of an alkali metal hydroxide or its silanolate and a phase transfer catalyst. As the silanolate of an alkali metal hydroxide, it is preferred to employ a silanolate obtained by reacting an alkali metal hydroxide with the above-mentioned cyclic trisiloxane. The phase transfer catalyst may be optionally selected from quaternary ammonium salts and quaternary phosphonium salts represented by the formulas $R_4{}^8N^+X^-$ and $R_4{}^8P^+X^-$ wherein $R^8$ is an alkyl group, a cycloalkyl group or an aryl group, and X is chlorine or bromine. Particularly preferred is a quaternary ammonium chloride or a quaternary phosphonium chloride wherein X is chlorine.

The amounts of the alkali metal hydroxide or its silanolate and the phase transfer catalyst are suitably selected depending upon the desired degree of polymerization and other polymerization conditions. The alkali metal hydroxide or its silanolate is used preferably in an amount of from 1 to 1,000 ppm, particularly from 5 to 100 ppm, as the amount of the alkali metal hydroxide relative to the total amount of the monomers. The phase transfer catalyst is used preferably in an amount of from 1 to 500 ppm relative to the total amount of the monomers, particularly in an equimolar amount to the alkali metal hydroxide.

Further, the fluorosilicone polymer can be produced by subjecting the monomers to polymerization in the presence of a polymerization catalyst containing an alkali metal silanolate having a fluoroalkyl group (hereinafter referred to simply as polymerization catalyst (A)). The silanolate having a fluoroalkyl group is meant for a silanolate wherein some or all of organic groups bonded to silicone are fluoroalkyl groups. A part or whole of such an alkali metal silanolate having a fluoroalkyl group is preferably in the form of a complex with at least one member selected from the group consisting of an ether, a quaternary ammonium salt and a quaternary phosphonium salt. Further, it is preferably dissolved or dispersed in a liquid of a low molecular weight cyclic polysiloxane having a fluoroalkyl group, whereby the initial period before the initiation of the polymerization can be shortened. As the ether, a cyclic polyether, a non-cyclic polyether or a polyoxaalkylamine may be employed. As the cyclic polyether, 18-crown-6 or dicyclohexyl-18-crown-6 is preferably employed. As the non-cyclic polyether, a polyethylene glycol dialkyl ether is preferably employed. As the polyoxaalkylamine, a trispolyoxaalkylamine of the formula $N[CH_2CH_2(OCH_2CH_2)_yOCH_3]_3$ wherein y is an integer of 1 or 2, is preferably employed.

Polymerization catalyst (A) may contain an alkali metal hydroxide in addition to the above-mentioned compound. The alkali metal hydroxide is preferably in the form of a complex with at least one member selected from the group consisting of an ether, a quaternary ammonium salt and a quaternary phosphonium salt.

Polymerization catalyst (A) can be prepared by reacting a cyclic polysiloxane having a fluoroalkyl group with an alkali metal hydroxide. Particularly preferred is polymerization catalyst (A) obtained by polymerizing a cyclic trisiloxane having a fluoroalkyl group in the presence of at least one member selected from the group consisting of an ether, a quaternary ammonium salt and a quaternary phosphonium salt and an alkali metal hydroxide as a catalyst, followed by depolymerization. In such a process for the preparation of polymerization catalyst (A), it is preferred to use the alkali metal hydroxide in an amount in excess of the amount usually employed for a polymerization catalyst.

In this process, there is no particular restriction as the amount of polymerization catalyst (A). And the amount of polymerization catalyst (A) is suitably selected depending upon the polymerization conditions, the desired degree of polymerization for the resulting polymer, etc. When it is desired to produce a polymer having a relatively low degree of polymerization, polymerization catalyst (A) is used in a relatively large amount. Whereas when it is desired to produce a polymer having a high degree of polymerization, polymerization catalyst (A) is used preferably in a relatively small amount. It is preferred that the amount of the alkali metal hydroxide where all the alkali metal in polymerization catalyst (A) is calculated as the alkali metal hydroxide, is from about 0.1 to about 1,000 ppm, particularly from about 1 to about 100 ppm, relative to the total amount of the monomers. If the amount of polymerization catalyst (A) is excessive, the depolymerization reaction tends to be active, and if the amount is too small, no adequate polymerization rate is obtainable.

In either the process wherein a polymerization catalyst containing a phase transfer catalyst is employed or the process wherein a polymerization catalyst containing an alkali metal silanolate having a fluoroalkyl group is employed, the polymerization is preferably conducted at a relatively low temperature. If the polymerization is conducted at a high temperature, the depolymerization reaction tends to be active, whereby the control of the polymerization system becomes cumbersome. The temperature for the polymerization is preferably from 0° to 150° C., more preferably from 0° to 80° C. The polymerization may be conducted in a solvent, or in the absence of a solvent. As the solvent, a fluorine-type solvent such as trichlorotrifluoroethane, is suitable.

It is desirable that the polymerization is terminated when the degree of polymerization of the fluorosilicone polymer has reached a desired level. The polymerization can be terminated by an addition of a neutralizing agent to neutralize the catalyst or a polymerization terminator such as a terminal sealing agent to seal the terminals of the polymer. As the polymerization terminator, an organic acid such as acetic acid, an inorganic acid such as hydrochloric acid or phosphoric acid, $CO_2$, $H_2O$ or a halosilane of the formula $R^9R^{10}R^{11}SiX$ is suitable. Each of $R^9$, $R^{10}$ and $R^{11}$ which may be the same or different, is an alkyl group having at most 6 carbon atoms, a fluoroalkyl group having at most 16 carbon atoms, a cycloalkyl group having at most 8 carbon atoms, an alkenyl group, a phenyl group or X. X is a chlorine atom or a bromine atom. X is preferably a chlorine atom. The most preferred halosilane is a triorganochlorosilane wherein at least one of $R^9$, $R^{10}$ and $R^{11}$ is a vinyl group, the rest being a methyl group, and X is a chlorine atom, or trimethylchlorosilane. After the termination of the polymerization reaction, unreacted monomers, by-products, catalyst residues, etc. are removed from the polymer by distillation, solvent extraction, washing or reprecipitation, whereby the desired fluorosilicone polymer is obtained. The resulting fluorosilicone polymer is required to have a viscosity of at least about 100 centipoise at 25° C. When the fluorosilicone polymer is used as it is or after being cross-linked, as an elastomer of rubber, its viscosity is preferably at least about 10,000 centipoise, preferably at least about 10,000,000 centipoise. There is no particular limitation as to the upper limit of the viscosity, but the viscosity is usually at most about 100,000,000 centipoise. The viscosity may be lower in the case of a fluorosilicone polymer to be used for other purposes e.g. as silicone oil.

The fluorosilicone polymer of the present invention may be combined with a cross-linking agent and a filler to obtain a curable composition. As such a cross-linking agent, a peroxy compound is preferably employed. As the filler, silica, particularly silica having the surface treated with a polysiloxane having a fluoroalkyl group, is preferred, since it can easily be incorporated to the fluorosilicone polymer, and the mechanical properties of the cured product are excellent.

Now, the present invention will be described in further detail with reference to Examples. However, it should be understood that the present invention is by no means restricted to such specific Examples.

EXAMPLE 1

Into a flask having an internal capacity of 50 ml, 20 g (22 mmol) of $\{(C_4F_9CH_2CH_2)(CH_3)SiO\}_3$ and 0.227 g (0.88 mmol) of $\{(CH_2=CH)(CH_3)SiO\}_3$ were charged under an argon atmosphere and kept at 25° C. A uniform solution of a equimolar complex of KOH and dicyclohexyl-18-crown-6 in $\{(C_4F_9CH_2CH_2)(CH_3)SiO\}_{\overline{m}}$ wherein m is an integer of at least 4, was added as a catalyst in such an amount that KOH satisfied Si/K=34,000, to initiate the polymerization. After conducting the polymerization for 2.5 hours, the polymerization was terminated by neutralizing the catalyst with an excess amount of dimethylvinyl chlorosilane. The product was dissolved in trichlorotrifluoroethane, washed with water, then precipitated again from heptane and dried at 100° C. under reduced pressure to obtain 18 g of a polymer having a viscosity of 10,000,000 centipoise at 25° C.

EXAMPLE 2

The operation was conducted in the same manner as in Example 1 except that $\{(CH_2=CH)(CH_3)SiO\}_3$ was used in an amount of 0.114 g (0.44 mmol), whereby 18 g of a polymer having a viscosity of 10,000,000 centipoise at 25° C. was obtained.

EXAMPLE 3

Into a flask having an internal capacity of 50 ml, 20 g (22 mmol) of $\{(C_4F_9CH_2CH_2)(CH_3)SiO\}_3$, 2.2 g (10 mmol) of $\{(CH_3)_2SiO\}_3$ and 0.124 g (0.48 mmol) of $[(CH_2=CH)(CH_3)SiO]_3$ were charged under an argon atmosphere and kept at 75° C. Then, 0.0048 g (0.032 mmol) of CsOH was added to initiate the polymerization. Twenty minutes later, the polymerization was terminated by neutralizing the catalyst with an excess amount of dimethylvinyl chlorosilane. The product was dissolved in trichlorotrifluoroethane, washed with water, then precipitated again from heptane and dried at 100° C. under reduced pressure to obtain 19 g of a polymer having a viscosity of 9,000,000 centipoise at 20° C.

EXAMPLE 4

To each of the polymers obtained in Examples 1, 2 and 3, 50 parts by weight of silica treated with $\{(C_4F_9CH_2CH_2)(CH_3)SiO\}_3$, and 2 parts of a peroxide ("RC-450", tradename, manufactured by Toray Silicone) were incorporated. The mixture was press-cured at 170° C. for 10 minutes and then oven-cured at 200° C. for 4 hours. The cured products of the polymers obtained in Examples 1 and 3 were subjected to a dipping test (JIS K-6301), and the results are shown in Table 1 together with the results of dimethylsilicone rubber and methyltrifluoropropylsilicone rubber. Further, the torque changes during the curing of each of the polymers obtained in Examples 1, 2 and 3 and a homopolymer composition of $\{(C_4F_9CH_2CH_2)(CH_3)SiO\}_3$ containing no vinyl group, as measured by a curastometer, are shown in Table 2.

TABLE 1

| | (25° C. for 72 hrs; Volume change (%)) | | | | |
|---|---|---|---|---|---|
| | Test oil | | | | |
| Sample | Acetone | Methanol | DMF | CCl₄ | Fuel B |
| Example 1 | 57 | 8 | 25 | 16 | 21 |
| Example 3 | 29 | 4 | 10 | 32 | 25 |
| Dimethyl-silicone rubber | 18 | 2 | 4 | 360 | 265 |
| Methyltri-fluoropropyl-silicone rubber | 210 | 11 | 74 | 19 | 21 |

TABLE 2

| | (170° C., $\Delta T_R$ (kg-cm)) | | | |
|---|---|---|---|---|
| Sample | Example 1 | Example 2 | Example 3 | Homopolymer of $[(C_4F_9CH_2CH_2)(CH_3)SiO]_3$ |
| $\Delta T_R$ | 27.2 | 4.5 | 48.1 | 0 |

EXAMPLE 5

Into a 50 ml flask equipped with a stirrer, 10.0 g (11 mmol) of $\{C_4F_9CH_2CH_2(CH_3)SiO\}_3$, 5.0 g (11 mmol) of $\{CF_3F_9CH_2CH_2(CH_3)SiO\}_3$, and 0.029 g (0.11 mmol) of $\{CH_2=CH(CH_3)SiO\}_3$, were charged under an argon atmosphere and kept at 25° C. To this flask, 0.12 g of polymerization catalyst (1) (obtained in Synthesis 1 of polymerization catalyst given hereinafter) (about 6 ppm as KOH) was added, and the mixture was stirred at 25° C. About 1.5 hours later, the viscosity of the reaction solution reached almost the maximum, when about 10 mg of dimethylvinylchlorosilane was added. Then, the reaction product was dissolved in 1,1,2-trichlorotrifluoroethane (hereinafter referred to as R-113), washed with water, then precipitated again from heptane and dried at 100° C. under reduced pressure, whereby 13 g of a fluorosilicone copolymer (hereinafter referred to as copolymer A) was obtained. Its viscosity at 25° C. was 28,000,000 centipoise. The molar ratios of the respective monomer units in the copolymer were measured by ¹HNMR and ¹⁹FNMR, whereby the ratios were found to be about 1:1:0.01 in the above-mentioned order, thus indicating substantially the same molar ratios as the molar ratios of the charged monomers.

EXAMPLES 6 to 9 and COMPARATIVE EXAMPLE 1

The polymerization was conducted in the same manner as in Example 5 except that the proportions of $\{C_4F_9CH_2CH_2(CH_3)SiO\}_3$, $\{CF_3CH_2CH_2(CH_3)SiO\}_3$ and $\{CH_2=CH(CH_3)SiO\}_3$, were changed, and the products were purified to obtain copolymers. The proportions (molar ratios) of the monomers used for the production of the respective copolymers, and the viscosities of the obtained copolymers are shown in Table 3. The proportions of the monomer units in the respective copolymers were measured by ¹HNMR and ¹⁹FNMR, whereby the proportions were found to be substantially the same as the proportions of the charged monomers.

On the other hand, as a Comparative Example, either $-[C_4F_9CH_2CH_2(CH_3)SiO]_3-$ or $-[CF_3CH_2CH_2(CH_3)SiO]_3-$ is copolymerized with $-[CH_2=CH(CH_3)SiO]_3-$. The proportions of the monomer units in the copolymer were substantially the same as the proportions of the charged monomers. The viscosity of this copolymer is shown in Table 3.

TABLE 3

|  | Proportions | | | Viscosity | |
| --- | --- | --- | --- | --- | --- |
|  | A | B | C | (× 10,000 cp) | Copolymer |
| Example 5 | 1 | 1 | 0.01 | 2,800 | A |
| Example 6 | 1 | 0.5 | 0.0075 | 2,000 | B |
| Example 7 | 1 | 2 | 0.015 | 4,400 | C |
| Example 8 | 1 | 2.7 | 0.018 | 5,200 | D |
| Example 9 | 1 | — | 0.04 | 500 | E |
| Comparative Example 1 | — | 1 | 0.005 | 4,000 | F |

A: $-[C_4F_9CH_2CH_2(CH_3)SiO]_3-$
B: $-[CF_3CH_2CH_2(CH_3)SiO]_3-$
C: $-[CH_2=CH(CH_3)SiO]_3-$

Physical property tests

Copolymers A to F prepared in Examples 5 to 9 and Comparative Example 1 were cured, and the physical properties of the cured products (cured products A to F) were measured.

Curing of copolymers A to F was conducted in the following manner.

100 Parts by weight of each of copolymers A to F, 50 parts of humed silica ("Aerosil 300" manufactured by Nihon Aerosil Company Ltd.) pretreated with $-[CF_3CH_2CH_2(CH_3)SiO]_3-$ and 1 part (2 parts in the case of copolymer E) of a peroxide ("RC-450p" manufactured by Toray Silicone Company Ltd.), were thoroughly kneaded by a two-roll rubber mill, and then subjected to press-curing (170° C. for 10 minutes, and then to ovencuring (200° C. for 4 hours) to obtain a cured product. The solvent resistance of each cured product was measured in accordance with JIS K-6301. The volume change (%) after being kept at 25° C. for 72 hours is shown in Table 4.

TABLE 4

| | Solvent | | | | |
| --- | --- | --- | --- | --- | --- |
| Copolymer | Acetone | Methanol | DMF | Carbon trichloride | Fuel B |
| A | 68 | 4 | 20 | 15 | 19 |
| B | 60 | 7 | 21 | 15 | 19 |
| C | 83 | 3 | 19 | 14 | 16 |
| D | 94 | 3 | 21 | 17 | 16 |
| E | 57 | 12 | 25 | 16 | 21 |
| F | 210 | 12 | 74 | 19 | 20 |

EXAMPLE 10

Into a 50 ml flask, 7 g of $-[C_4F_9CH_2CH_2(CH_3)SiO]_3-$ was charged under an argon atmosphere and kept at a temperature of 20° C. To this flask, 1.2 mg of KOH and 5.9 mg of $(C_4H_9)_4N^+Cl^-$ were added. The system was kept at 20° C., and about 1 hour later, 70 mg of dimethyldichlorosilane was added thereto. The product was dissolved in R-113, washed with water, then precipitated again from heptane and dried at 100° C. under reduced pressure, whereby 6.7 g of a fluorosilicone polymer was obtained. Its viscosity at 25° C. was 5,200,000 centipoise.

EXAMPLE 11

The operation was conducted in the same manner as in Example 10 except that 7.6 mg of $(C_6H_5)_4P^+Cl^-$ was used instead of $(C_4H_9)_4N^+Cl^-$ to obtain 6.8 g of a fluorosilicone polymer. The viscosity of the polymer was 5,800,000 centipoise.

EXAMPLES 12 to 14 and COMPARATIVE EXAMPLE 2

The operation was conducted in the same manner as in Example 10 except that the amount of KOH, the type and amount of the phase transfer catalyst and the polymerization time were selected so that the viscosity of the reaction product became the maximum. The polymerization condition, the yield and the viscosity of the polymer are shown in Table 5.

TABLE 5

|  |  | Example 12 | Example 13 | Example 14 | Comparative Example 2 |
| --- | --- | --- | --- | --- | --- |
| KOH (mg) |  | 0.2 | 0.8 | 0.8 | 1.2 |
| Phase transfer catalyst (mg) | A | 0.9 | — | — | — |
|  | B | — | 2.5 | — | — |
|  | C | — | — | 4.3 | — |
| Polymerization time (hr) |  | 1.5 | 1.0 | 1.0 | 2.0 |
| Yield (g) |  | 6.9 | 6.3 | 6.8 | 7.0 |
| Viscosity (cp) |  | 10,000,000 | 4,200,000 | 7,500,000 | 40* |

A: $(C_4H_9)_4N^+Cl^-$
B: $PhCH_2(CH_3)_3N^+Cl^-$
C: $C_{16}H_{33}(CH_3)_3N^+Cl^-$
*: Not polymerized Synthesis 1 of polymerization catalyst Into a flask equipped with a stirrer and flushed with argon, 11.7 g of $-[C_4F_9CH_2CH_2(CH_3)SiO]_3-$, 9.0 mg of KOH and 71.7 mg of dicyclohexyl-18-crown-6 were charged at room temperature. After a while, the viscosity of the system started to increase. About 1 hour after the viscosity of the system started to increase, the viscosity reached the maximum, and then it started to decrease. Stirring was continued for 12 hours after the viscosity reached the maximum, whereupon a transparent liquid was obtained. This transparent liquid was designated as polymerization catalyst (1).

Synthesis 2 of polymerization catalyst

A transparent liquid was obtained in the same manner as in Synthesis 1 of polymerization catalyst except that the amount of $-[C_4F_9CH_2CH_2(CH_3)SiO]_3-$, was changed to 15.5 g, the amount of KOH was changed to 5.2 mg and 29 mg of $(C_4H_9)_4N^+Cl^-$ was used instead of dicyclohexyl-18-crown-6. This liquid was designated as polymerization catalyst (2).

EXAMPLES 15 and 16 and COMPARATIVE EXAMPLES 3 and 4

A flask equipped with a stirrer and a torque meter was flushed with argon. To this flask, the monomer(s) as identified in Table 6 and 4.3 g of R-113 were charged and heated to 50° C. Then, the polymerization catalyst as identified in Table 6 was added, and the stirring was continued. The torque in each system as time passed since the addition of the polymerization catalyst, was shown in Table 7.

TABLE 6

| | Monomer (g) | | |
|---|---|---|---|
| | A | B | Polymerization catalyst |
| Example 15 | 10 | — | Polymerization catalyst (1) 0.24 g |
| Comparative Example 3 | 10 | — | KOH 0.18 mg Dicyclohexyl-18-crown-6 1.2 mg |
| Example 16 | 10 | $56.2 \times 10^{-3}$ | Polymerization catalyst (2) 0.55 g |
| Comparative Example 4 | 10 | $56.2 \times 10^{-3}$ | KOH 0.18 mg $(C_4H_9)_4N^+Cl^-$ 0.6 mg |

A: $\{C_4F_9CH_2CH_2(CH_3)SiO\}_3$
B: $\{CH_2\!=\!CH(CH_3)SiO\}_3$

TABLE 7

| | (Unit: kg-cm) | | | | | |
|---|---|---|---|---|---|---|
| | 1 min. | 10 min. | 20 min. | 30 min. | 200 min. | 250 min. |
| Example 15 | 0.2 | 0.6 | 0.8 | 1.2 | — | — |
| Comparative Example 3 | 0.2 | ← | ← | ← | 0.3 | 0.4 |
| Example 16 | 0.2 | 0.7 | 0.9 | 1.1 | — | — |
| Comparative Example 4 | 0.2 | ← | ← | ← | 03 | 0.4 |

In Examples 15 and 16, the polymerization was terminated at 30 minutes

EXAMPLE 17

Into a flask flushed with argon, 60.9 g of $\{C_4F_9CH_2CH_2(CH_3)SiO\}_3$ as a monomer and 26.1 g of furon R-113 were charged and heated to 50° C. Then, 1.65 g of polymerization catalyst (1) was introduced, and the stirring was continued. About 30 minutes layer, 5 µl of $(CH_3)_3SiCl$ was added to terminate the polymerization. The polymer thus obtained was washed with a 5% sodium dicarbonate aqueous solution and water and then precipitated again from heptane. Then, it was dried under reduced pressure at 100° C. for 12 hours. The viscosity of the polymer at 25° C. was 5,400,000 centipoise.

EXAMPLE 18

The operation was conducted in the same manner as in Example 17 except that the monomer was changed to 14.1 g of $\{C_4F_9CH_2CH_2(CH_3)SiO\}_3$ and 79 mg of $\{CH_2\!=\!CH(CH_3)SiO\}_3$ and the amount of R-113 was changed to 6.0 g, and the catalyst was changed to 0.78 g of polymerization catalyst (2).

The viscosity of the polymer thus obtained at 25° C. was 4,900,000 centipoise.

We claim:

1. A fluorosilicone polymer, comprising:
   the polymerization reaction product of from 30 to 99.95 mol % of a cyclic trisiloxane of the formula (a) $\{R_fCH_2CH_2(R^1)SiO\}_n$, from 0.05 to 10 mol % of a cyclic siloxane of the formula (b) $\{R^2R^3SiO\}_m$, and from 5 to 69.95 mol % of a cyclic siloxane of the formula (c) $\{CF_3CH_2CH_2(R^4)SiO\}_m$, wherein each of $R^1$, $R^3$ and $R^4$ is a monovalent organic group, $R_f$ is a perfluoroalkyl group having from 4 to 6 carbon atoms, $R^2$ is an alkenyl group and each of m and n is an integer of from 3 to 6.

2. The fluorosilicone polymer according to claim 1, which has a viscosity of at least 1,000,000 centipoise at 25° C.

3. The fluorosilicone polymer according to claim 1, wherein each of $R^1$, $R^3$ and $R^4$ is a methyl group, an ethyl group or a phenyl group.

4. The fluorosilicone polymer according to claim 1, wherein $R^2$ is a vinyl group.

5. The fluorosilicone polymer according to claim 1, wherein the proportion of the units of a cyclic siloxane the formula (b) $R^2R^3SiO_m$, is from 0.1 to 5 mol %.

6. The fluorosilicone polymer according to claim 1, wherein each of m and n is 3.

* * * * *